US008882260B2

(12) United States Patent
Kanasugi et al.

(10) Patent No.: US 8,882,260 B2
(45) Date of Patent: Nov. 11, 2014

(54) TRANSFER TYPE INKJET RECORDING METHOD

(75) Inventors: Yuichiro Kanasugi, Tokyo (JP); Shinsuke Tsuji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 111 days.

(21) Appl. No.: 13/306,790

(22) Filed: Nov. 29, 2011

(65) Prior Publication Data

US 2012/0140009 A1    Jun. 7, 2012

(30) Foreign Application Priority Data

Dec. 3, 2010    (JP) ................... 2010-270784

(51) Int. Cl.
*B41J 2/01*    (2006.01)
*C09D 11/54*    (2014.01)
*B41J 2/005*    (2006.01)

(52) U.S. Cl.
CPC .................. *B41J 2/0057* (2013.01); *C09D 11/54* (2013.01)
USPC ........................................................... 347/103

(58) Field of Classification Search
CPC ................ B41J 2/0057; C09D 11/54
USPC ......... 347/9, 20, 21, 88, 95, 96, 99–101, 103, 347/105; 106/31.6, 31.13, 31.27, 31.47; 523/160, 161
IPC ............................................................. B41J 2/01
See application file for complete search history.

(56) References Cited

U.S. PATENT DOCUMENTS

| | | | |
|---|---|---|---|
| 5,730,876 A | 3/1998 | You | |
| 2008/0006176 A1* | 1/2008 | Houjou | 106/31.13 |
| 2008/0055385 A1* | 3/2008 | Houjou | 347/213 |
| 2008/0105160 A1* | 5/2008 | Doi et al. | 106/31.6 |
| 2008/0305262 A1* | 12/2008 | Yanagi et al. | 427/256 |
| 2009/0035468 A1* | 2/2009 | Matsuyama et al. | 427/256 |
| 2009/0041932 A1* | 2/2009 | Ishizuka et al. | 427/152 |
| 2010/0295891 A1* | 11/2010 | Goto et al. | 347/21 |

FOREIGN PATENT DOCUMENTS

| | | |
|---|---|---|
| JP | 2003-246135 A | 9/2003 |
| JP | 2008-018719 A | 1/2008 |
| JP | 2009-096175 A | 5/2009 |

* cited by examiner

*Primary Examiner* — Manish S Shah
*Assistant Examiner* — Roger W Pisha, II
(74) *Attorney, Agent, or Firm* — Canon U.S.A., Inc. IP Division (57) ABSTRACT

A transfer type inkjet recording method uses an aggregation liquid, in which the aggregation liquid contains a polymer compound having either one of a polysaccharide having an amino group or a polysaccharide salt having an amino group.

8 Claims, 1 Drawing Sheet

TRANSFER TYPE INKJET RECORDING METHOD

BACKGROUND OF THE INVENTION

1. Field of the Invention

The present invention relates to a transfer type inkjet recording method.

2. Description of the Related Art

As one of printing methods, a recording method (transfer type inkjet recording method) is mentioned which includes forming an intermediate image on an intermediate transfer member by an inkjet recording method, and transferring the intermediate image to a recording medium to form a final image. In the transfer type inkjet recording method, a method is known which includes giving an aggregation liquid which aggregates inks to an intermediate transfer member in order to increase image performance and water resistance (Japanese Patent Laid-Open No. 2003-246135). The method described in Japanese Patent Laid-Open No. 2003-246135 aggregates the inks on the intermediate transfer member with an aggregation liquid containing a cationic polymer, such as dicyandiamide resin or polyallylamine, to suppress bleeding (mixture of colors of inks) to thereby increase image performance. Furthermore, by increasing the molecular weight of cationic substances, the film strength of images is increased to thereby increase the water resistance.

However, according to an examination of the present inventors, the recording method described in Japanese Patent Laid-Open No. 2003-246135 has the following problems. First, there is a problem in that the transfer properties in transferring the intermediate image on the intermediate transfer member to a recording medium are not good and the final image formed on the recording medium is distorted. This is considered to be because the aggregation properties of inks forming the intermediate image are insufficient when the printing Duty is high, so that the internal aggregation force of the intermediate image required for transferring becomes insufficient. Such a reduction in the transfer properties is particularly remarkable when a uncoated paper having relatively high surface roughness or the like is used as the recording medium.

Furthermore, there is a problem in that scratch resistances when moisture is given to printed substances which are required in commercial printed substances and the like are insufficient. The commercial printed substances are left as they are in a state where water adheres onto the printed substances, and then used after removing the water in some cases. The scratch in such a state where moisture is given thereto is referred to as "Wet scratch". When the printed substances obtained by the recording method described in Japanese Patent Laid-Open No. 2003-246135 have been subjected to the Wet scratch, scratch marks are generated on the images to cause considerable distortion in some cases. This is considered to occur due to the fact that when water is left on the printed substances on which images are formed, the water permeates into the printed surface so that the printed surface is swollen to be deteriorated, and then water wiping is performed in such a state, resulting in the separation of the swollen printed surface.

In the case where the inks are color inks, bleeding has sometimes occurred when high concentration images having a high printing Duty have been formed. This is considered to be because the aggregation force is not sufficient when a component which aggregates the ink is only a cationic polymer (aggregation agent), and when the ink amount is large relative to the amount of the aggregation liquid per unit area, it becomes difficult to sufficiently aggregate the inks forming the intermediate image.

SUMMARY OF THE INVENTION

Therefore, aspects of the present invention provide a transfer type inkjet recording method with good transfer properties and good Wet scratch resistances of the final image even when the printing Duty is high.

The above-described problems maybe solved according to aspects of the following invention. More specifically, aspects of the present invention include a transfer type inkjet recording method, including forming an intermediate image by applying ink containing an anionic component to an image formation surface of an intermediate transfer member to which an aggregation liquid containing an aggregation agent which aggregates the anionic component in the ink has been applied by an inkjet recording method, and a transferring the intermediate image from the image formation surface having the intermediate image formed thereon to a recording medium by pressing the recording medium to the image formation surface, in which the aggregation liquid contains a polymer compound having a polysaccharide structure having an amino group.

Aspects of the invention can provide a transfer type inkjet recording method with good transfer properties and good Wet scratch resistances of the final image even when the printing Duty is high.

Further features of the present invention will become apparent from the following description of exemplary embodiments with reference to the attached drawing.

BRIEF DESCRIPTION OF THE DRAWING

FIGURE illustrates an example of an image recording device which performs the inkjet recording method according to aspects of the invention.

DESCRIPTION OF THE EMBODIMENTS

Figure 1:
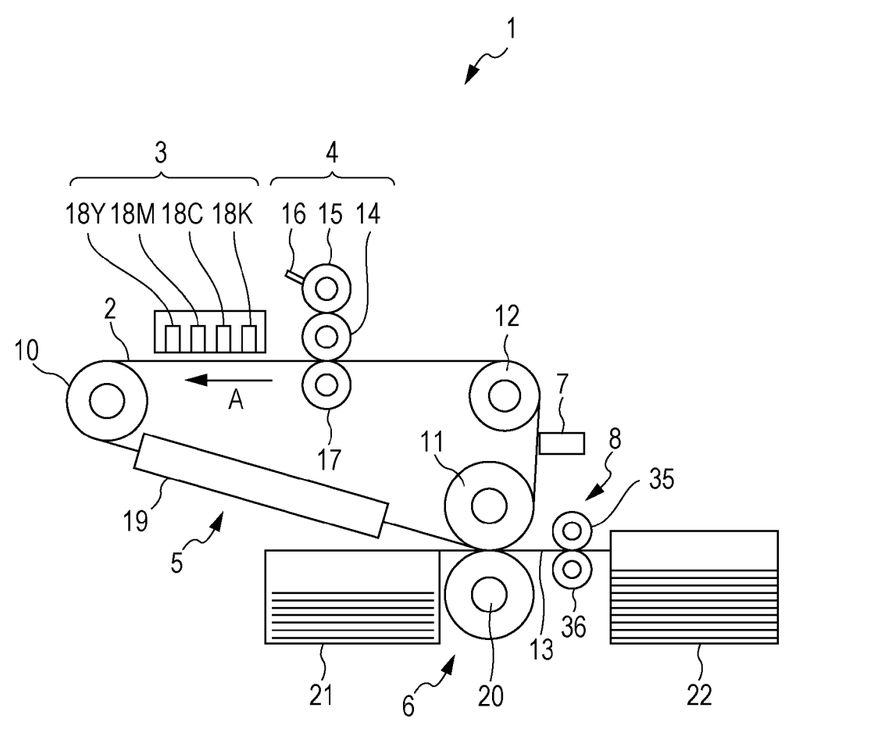

Hereinafter, aspects of the invention are described in detail.

Ink

The ink for use in the transfer type inkjet recording method according to aspects of the invention contains an anionic component.

Mentioned as the anionic component is one exhibiting a minus charge. Mentioned as suitable anionic components are carboxylic acid, sulfonic acid, phosphonic acid, and compounds having an anionic group in which the above-mentioned acids are neutralized by a metal salt or organic amine, and the like. The anionic component is suitably a high molecular weight substance. This is because when a component forming an ionic bond with the cationic component in the aggregation liquid is a high molecular weight substance, the film strength becomes high and the Wet scratch resistances become good. The high molecular weight substance to be used as the anionic component according to aspects of the invention is suitably a dispersant which disperses color materials. When the high molecular weight substance is a dispersant which disperses color materials, the weight average molecular weight is suitably 1,000 or more and 50,000 or lower and 5,000 or more and 20,000 or lower. When the high molecular weight substance is in the shape of emulsion particles, the weight average molecular weight is suitably 1,000 or more and 10,000,000 or lower.

According to aspects of the invention, the anionic component may be a pigment having an anionic functional group or may be an anionic dye.

The ink according to aspects of the invention may contain a functional additive in order to further increase the fastness of the final image. Mentioned as the functional additive are known water soluble resin, water insoluble resin fine particles, and the like. The materials to be used are not limited insofar they can be co-exist with other ink components. The water insoluble resin fine particles refer to fine particles of a water insoluble polymer which can be dispersed in an aqueous medium by a functional group (particularly an acidic group or a salt thereof) contained therein and which does not contain a free emulsifier. Mentioned as the water insoluble polymer are, for example, water insoluble polymers and the like described in Japanese Patent Laid-Open No. 2009-096175.

The ink according to aspects of the invention may be a clear ink not containing a color material or may be a color ink containing a color material. Usable as the color material to be compounded are known dyes and pigments described in Japanese Patent Laid-Open No. 2008-018719. Moreover, in order to disperse the color material, dispersants described in Japanese Patent Laid-Open No. 2008-018719 can be used.

The ink according to aspects of the invention suitably contains water and an organic solvent. The organic solvent is suitably a water soluble material having a high boiling point and a low vapor pressure as shown below. For example, polyethylene glycol, polypropylene glycol, ethylene glycol, propylene glycol, butylene glycol, triethylene glycol, thiodiglycol, hexylene glycol, diethylene glycol, ethylene glycol monomethyl ether, diethylene glycol monomethyl ether, glycerin, and the like are mentioned. These substances may be used singly or in combination of two or more kinds thereof. Moreover, alcohols, such as ethyl alcohol or isopropyl alcohol, or surfactants may be added into the ink as a component for adjusting the viscosity, surface tension, and the like.

The compounding ratio of the components constituting the ink is not particularly limited and may be adjusted as appropriate in the range where ejection can be achieved in accordance with the ejection power, the diameter of a nozzle, and the like of the selected inkjet head. When the total ink amount is adjusted to 100% by mass, the color material is suitably 0.1% by mass or more and 10% by mass or lower. The organic solvent is suitably 5% by mass or more and 40% by mass or lower. The surfactant is suitably 0.01% by mass or more and 5% by mass or lower. Then, the balance may be adjusted with water. The ink according to aspects of the invention is suitably an aqueous ink containing 40% by mass or more of water.

Aggregation Liquid

The aggregation liquid for use in the transfer type inkjet recording method according to aspects of the invention contains an aggregation agent. The aggregation liquid further contains a polymer compound having a polysaccharide structure having an amino group. According to aspects of the invention, in order to dissolve the polymer compound, one in which the polymer compound is formed into a salt state may be used. More specifically, according to aspects of the invention, the polysaccharide having an amino group in the structure of the polymer compound includes a polysaccharide salt having an amino group.

It is important for the aggregation agent to have a function of aggregating the anionic component in the ink and to be co-exist with the polymer compound (the polymer compound according to aspects of the invention described later) in the aggregation liquid. As such an aggregation agent, a metal salt which generates metal ions or an acidic compound which varies a hydrogen ion concentration (pH) is suitable.

As the metal salt, one which generates the following polyvalent metal ions is used, for example. For example, divalent metal ions, such as $Ca^{2+}$, $Cu^{2+}$, $Ni^{2+}$, $Mg^{2+}$, and $Zn^{2+}$, trivalent metal ions, such as $Fe^{3+}$ and $Al^{3+}$, and the like are mentioned. When a liquid containing these metal salts is applied, the liquid is suitably applied as an aqueous metal salt solution. Mentioned as negative ions of metal salts are $Cl^-$, $NO_3^-$, $SO_4^{2-}$, $I^-$, $Br^-$, $ClO_3^-$, $RCOO^-$ (R is a monovalent organic group), and the like.

The acidic compound suitably has a pH buffering ability from the viewpoint of the aggregation performance of the ink and suitably has an acid dissociation constant (pKa) of 4.5 or lower. When the acid dissociation constant exceeds 4.5, the aggregation performance decreases, so that a complex aggregate obtained by the anionic component in the ink, the aggregation agent in the aggregation liquid, and the polymer compound according to aspects of the invention is difficult to sufficiently form. As an example of the acidic compound, organic carboxylic acid, organic sulfonic acid, and the like are mentioned. More specifically, polyacrylic acid, acetic acid, methanesulfonic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarinic acid, thiophene carboxylic acid, and nicotinic acid, or derivatives of these compounds, salts thereof, and the like are mentioned.

The above-described metal salts and acidic compounds may be used singly or in combination of two or more kinds thereof. The content of the aggregation agent in the aggregation liquid is suitably 0.01% by mass or more and 90% by mass or lower based on the total mass of the aggregation liquid. The content thereof is more suitably 1% by mass or more and still more suitably 10% by mass or more. The content thereof is more suitably 80% by mass or lower and still more suitably 70% by mass or lower. When the content thereof is lower than 0.01% by mass, the aggregation agent cannot sufficiently aggregate the anionic components in some cases. When the content thereof exceeds 90% by mass, the aggregation agent is non-uniformly present as insoluble substances in the aggregation liquid depending on the type of the aggregation agent in some cases, which sometimes results in the fact that the application of the aggregation liquid or the formation of the intermediate image becomes difficult.

The aggregation liquid for use according to aspects of the invention contains the polymer compound having a polysaccharide structure having an amino group (hereinafter referred to as the polymer compound according to aspects of the invention). The polysaccharide according to aspects of the invention is a compound obtained by dehydration and condensation of two or more molecules of monosaccharides by a glycoside linkage. A polysaccharide salt is a salt of a polysaccharide. Among the polysaccharides having an amino group, one whose weight average molecular weight exceeds 10,000 is equivalent to the polymer compound of the invention itself.

The amine value (the number of moles of an amino group contained per g of the polymer compound and a salt thereof) of the polymer compound according to aspects of the invention is suitably 0.3 mmol/g or more and more suitably 0.5 mmol/g or more. The amine value is suitably 14.0 mmol/g or lower, more suitably 8.0 mmol/g or lower, and still more suitably 6.0 mmol/g or lower. When the amine value is lower than 0.3 mmol/g, it becomes difficult to sufficiently form an ionic bond of a large number of anionic components in the inks to form an aggregate, so that the coating properties of the intermediate image decrease, sometimes resulting in the fact that the transfer properties become low. In the case of color ink, bleeding occurs. Furthermore, in the final image formed on a recording medium, an excessive amount of hydrophilic anionic components deriving from the ink remains, so that the Wet scratch resistances become low. In contrast, when the amine value is higher than 14.0 mmol/g, it becomes difficult to stably manufacture the polymer compound according to aspects of the invention in some cases. When the amine value is higher than 8.0 mmol/g, an excessive amount of hydrophilic amino groups of the polysaccharide or the polysaccharide salt remains relative to the anionic components particularly in the final image formed with a low Duty, so that the Wet scratch resistances become low in some cases.

The weight average molecular weight of the polymer compound according to aspects of the invention is suitably 30,000 or more and more suitably 200,000 or more. The weight average molecular weight thereof is suitably 10,000,000 or lower and more suitably 8,000,000 or lower. When the weight average molecular weight is lower than 30,000, the coating properties of the intermediate image decrease to reduce the transfer properties or the Wet scratch resistances of the final image decrease in some cases. In the case of color ink, bleeding occurs in some cases. When the weight average molecular weight exceeds 10,000,000, the viscosity of the aggregation liquid sharply increases with an increase in the addition amount of the polymer compound into the aggregation liquid, sometimes resulting in the fact that it becomes difficult to favorably apply the same onto the intermediate transfer member.

It is suitable for the aggregation liquid for use according to aspects of the invention to contain the polymer compound according to aspects of the invention in a proportion of 0.01% by mass or more and 50% by mass or lower relative to the total amount of the aggregation liquid. The polymer compound according to aspects of the invention is more suitably contained in a proportion of 0.1% by mass or more, still more suitably 1% by mass or more, and yet more suitably 3% by mass or more. The polymer compound according to aspects of the invention is more suitably contained in a proportion of 30% by mass or lower and still more suitably 20% by mass or lower. When the content is lower than 0.01% by mass, good transfer properties or Wet scratch resistances are not sufficiently developed in some cases. When the content exceeds 50% by mass, the viscosity of the aggregation liquid sharply increases with an increase in the addition amount thereof into the aggregation liquid, sometimes resulting in the fact that it becomes difficult to favorably apply the same onto the intermediate transfer member.

The polymer compound according to aspects of the invention may be in a dissolution state or a dispersion state in the aggregation liquid. When the polymer compound according to aspects of the invention is in the dispersion state, it is suitable that the particles are coated in the final image. When the particles are not coated in the final image, light scattering occurs due to the presence of the particles particularly when the particle diameter is large, so that the glossiness or water resistance of the final image decreases in some cases. Therefore, it is suitable to perform heating treatment at a temperature equal to or higher than the minimum film forming temperature of the particles in an image fixing process to sufficiently coat the particles.

Mentioned as the polysaccharide having an amino group in the polysaccharide structure having an amino group according to aspects of the invention are the following substances, for example. More specifically, starch derivatives having an amino group, cellulose derivatives having an amino group, guar gum derivatives having an amino group, locust bean gum derivatives having an amino group, fenugreek gum derivatives having an amino group, tara gum derivatives having an amino group, curdlan derivatives having an amino group, carrageenan derivatives having an amino group, chitosan derivatives, and the like are mentioned. The polymer compound according to aspects of the invention may contain only one kind of the polysaccharides having an amino group or two or more kinds thereof.

The polysaccharide having an amino group according to aspects of the invention can be obtained by cationizing a non-cationized polysaccharide or polysaccharide salt with a cationizing agent having an amino group, for example. Mentioned as the non-cationized polysaccharide or polysaccharide salt are, for example, are starch derivatives not having an amino group, cellulose derivatives not having an amino group, guar gum derivatives not having an amino group, locust bean gum derivatives not having an amino group, fenugreek gum derivatives not having an amino group, tara gum derivatives not having an amino group, curdlan derivatives not having an amino group, carrageenan derivatives not having an amino group, and the like. Mentioned as the cationizing agent having an amino group are, for example, glycidyl trimethyl ammonium chloride, 3-chloro-2-hydroxypropyl trimethylammonium chloride, 3-chloropropyl trimethylammonium chloride, glycidyl dimethyl ammonium chloride, and the like. As the polysaccharide having an amino group according to aspects of the invention, one is particularly suitable which is obtained by adding glycidyl trimethylammonium chloride, as the cationizing agent, to cellulose derivatives not having an amino group or guar gum derivatives not having an amino group. For example, hydroxyethylcellulose hydroxypropyl trimethylammonium chloride ether or guar hydroxypropyltrimonium chloride is suitable.

As the polysaccharide having an amino group according to aspects of the invention, chitosan is suitably used. The chitosan is obtained by deacetylating chitin obtained by decalcifying the shells of crustaceans, such as crab, shrimp, and krill, the shells of insects, such as beetles and grasshoppers, the bone of cuttlefish, and the like, and then removing the proteins therefrom. According to aspects of the invention, the chitosan obtained by the above-described method can be used for the materials of the polymer compound according to aspects of the invention. Chitosan (HFP chitosan, manufactured by Jakwang) obtained by the application of a membrane separation process (U.S. Pat. No. 5,730,876) is chitosan having a high molecular weight and high water solubility. The chitosan obtained by the process has a very high weight average molecular weight in which the weight average molecular weight is 200,000 or more and 1,000,000 or lower. Therefore, the chitosan obtained by the above-described method may be used as it is as the polymer compound according to aspects of the invention. The use of the polymer compound is suitable in terms of the transfer properties, the Wet scratch resistances of the final image, and the application properties onto the intermediate transfer member. The solubility of the chitosan obtained by the method is 3 g or more based on 100 g of water. Therefore, the polymer compound according to aspects of the invention is easily made to be present in a dissolution state in the aggregation liquid and the content of the chitosan in the aggregation liquid is easily adjusted, and therefore the chitosan is suitable.

The aggregation liquid to be used according to aspects of the invention suitably contains water, an organic solvent, an additive, and the like. As the organic solvent, the water-soluble organic solvents shown below are suitable. For example, polyethylene glycol, polypropylene glycol, ethylene glycol, propylene glycol, butylene glycol, triethylene glycol, thio diglycol, hexylene glycol, diethylene glycol, pentane diol, ethylene glycol monomethyl ether, diethylene glycol monomethyl ether, glycerin, and the like are mentioned.

By the use of the aggregation liquid containing the polymer compound according to aspects of the invention, even when the printing Duty is high, the final image with good transfer properties and good Wet scratch resistances can be formed. In the case of color ink, the occurrence of bleeding can be suppressed. The present inventors presume the reasons as follows. When the intermediate image is formed on the intermediate transfer member, a complex aggregation reaction occurs due to synergistic action of three components of the anionic component of the ink, the aggregation agent in the aggregation liquid, and the polymer compound according to aspects of the invention. Thus, sufficient aggregation performance which suppresses the occurrence of bleeding or the like can be developed independent of the ink amount. The intermediate image obtained by the complex aggregation reaction becomes an aggregate with a specifically high molecular weight and the transfer properties become very good. The image transferred to a recording medium has a specific three-dimensional crosslinking structure formed by the intermolecular force obtained by a hydrogen bond peculiar to hydroxyl groups present in the polymer compound according to aspects of the invention and an ionic bond formed by the above-described three components, and the Wet scratch resistances become good. The film having the above-described specific three-dimensional crosslinking structure can suppress the permeation of water into the film. Therefore, it is considered that the permeation properties of water into the film can be dramatically reduced to suppress the swelling and deterioration of the final image due to the water, so that that Wet scratch resistances becomes good.

Transfer Type Inkjet Recording Method and Image Recording Device

Next, the transfer type inkjet recording method and the configuration of the image recording device according to aspects of the invention are described.

FIGURE is a schematic view illustrating the outline structure of an example of the image recording device according to aspects of the invention. An image recording device 1 has an intermediate transfer member 2, an ink ejection portion 3, an aggregation liquid supply portion 4, a solvent removal portion 5, and a transfer portion 6 as the main configuration and further has a cleaning portion 7 and an image fixing portion 8. The intermediate transfer member 2 is constituted by an endless belt having a given width and has a structure in which the intermediate transfer member 2 is wound around a plurality of rollers 10, 11, and 12. It is configured so that the power of a motor (not illustrated) is transmitted to at least one main roller among the plurality of rollers 10, 11, and 12, and the intermediate transfer member 2 rotates by the drive of the motor outside each of the rollers 10, 11, and 12 in the direction indicated by the arrow A of FIGURE (hereinafter referred to as a transfer member rotation direction). Synchronizing with the rotation, the respective units of the aggregation liquid supply portion 4, the ink ejection portion 3, the solvent removal portion 5, the transfer portion 6, the cleaning portion 7, and the image fixing portion 8 disposed therearound operate. In this embodiment, a polyurethane belt is used as a support member of the intermediate transfer member 2 in terms of strength with which the belt can bear pressurization in transferring or dimension accuracy. The support member of the intermediate transfer member 2 may be any substance insofar as the surface layer of the intermediate transfer member 2 can establish at least line contact with the recording medium 13 and is selected in accordance with the form of the image recording device to be applied or the transfer form to the recording medium 13. For example, support members of a roller shape and a drum shape can also be suitably used.

For the intermediate transfer member 2, properties of forming an intermediate image by the supply of ink and transferring the formed intermediate image to a recording medium to form a good final image are important. When the transfer properties are high, the ink use efficiency is good, so that the amount of the ink to be discarded is reduced and also a load of a cleaning unit is reduced. The surface of the intermediate transfer member 2 therefor is suitably an ink non-absorbing surface and more suitably an ink non-adhering surface. Furthermore, the surface suitably has elasticity for following the surface of a recording medium, such as paper, for sufficient contact. Mentioned as materials which satisfy these properties are various kinds of plastics, rubber, and the like. In particular, silicone rubber, fluorosilicone rubber, fluororubber, and the like are suitably used in terms of non-adhesiveness. The rubber sometimes has a low surface energy and poor ink receiving properties, and therefor may be surface treated in accordance with the ink to be used. Mentioned as an example of the surface treatment are chemical treatment using chemicals, physical treatment which varies the surface shape, energy irradiation treatment which emits ultraviolet rays or plasma, and the like. According to aspects of the invention, a combination of the intermediate transfer member whose contact angle with the aggregation liquid to be used is 10° or more and 100° or lower and the aggregation liquid is extremely suitably used.

In the aggregation liquid supply portion 4, an aggregation liquid application roll 14, an aggregation liquid supply roll 15, an aggregation liquid amount regulation blade 16, and a roll coater using a facing roll 17 are disposed as units for giving the aggregation liquid onto the intermediate transfer member 2. This forms a configuration such that the aggregation liquid which contacts the anionic component in the ink to form an aggregate is given to the surface (image formation surface) of the intermediate transfer member 2. The aggregation liquid may be given by any one of a spray coater, squeezing, an inkjet recording method, and the like.

The aggregation liquid is applied in the aggregation liquid supply portion 4, and thereafter the ink is given to the image formation surface of the intermediate transfer member 2 from the ink ejection portion 3 by an inkjet recording method. Thus, the intermediate image formation process is performed in which the intermediate image (mirror image) is formed on the image formation surface of the intermediate transfer member 2. The ink ejection portion 3 is disposed at the downstream side of the transfer member rotation direction of the aggregation liquid supply portion 4. In the ink ejection portion 3, recording heads 18K, 18C, 18M, and 18Y corresponding to the colors of black (K), cyan (C), magenta (M), and yellow (Y) inks are provided. The respective recording heads 18K, 18C, 18M, and 18Y eject the corresponding color inks in accordance with external image signals from the ejection surface facing the intermediate transfer member 2. Thus, the respective color inks are given to the image formation surface of the intermediate transfer member 2. For the ink ejection portion 3, a continuous system and also one which ejects ink by an on-demand system using an electric heat conversion element (heat generation element), an electromechanical conversion element (piezoelectric element), or the like can also be used. As the form of the ink ejection portion 3, with respect to the configuration of FIGURE, for example, a line head type recording head obtained by arranging ink ejection ports in the direction orthogonal to the drawing can be used. Moreover, one may be acceptable which performs recording using a recording head in which ejection ports are arranged along the tangent of the intermediate transfer member 2 or in a given range of the circumferential direction and scanning the same in the axial direction. Furthermore, a recording head can also be used corresponding to the number of colors of inks for use in the image formation.

The solvent removal portion 5 is provided with a drying furnace 19 having a heating fan (not illustrated) in order to remove a liquid component from the intermediate image formed on the image formation surface of the intermediate transfer member 2 to a degree where good transfer can be achieved. When a reduction in the liquid component is insufficient, a surplus liquid overflows to distort the image in the transfer process which is the following process or the transfer properties decrease in some cases. Various measures which have been used heretofore can all be suitably applied as a measure for reducing the liquid component. Specifically, a measure using evaporation by heating, a measure for blowing dry air, a liquid absorption measure by an absorber, a measure containing a combination thereof, or the like can be suitably used.

Next, a transfer process is performed which includes pressure-bonding a recording medium 13 to the image formation surface on which the intermediate image is formed to transfer the intermediate image from the image formation surface to the recording medium 13. In the device illustrated in FIGURE, the intermediate transfer member 2 and the recording medium 13 are pressurized in such a manner as to be sandwiched by the roller 11 and the pressurization roller 20 to thereby realize efficient image transfer. According to this aspect, the liquid component in the ink already decreases on the intermediate transfer member 2 in this stage and the viscosity of the ink is increased, and therefore a good final image can be formed even using a recording medium with low ink absorbency, such as a coated paper.

In a conveyance portion 8, the recording medium 13 is conveyed from a paper feed tray 21 to a paper discharge tray 22 passing through the transfer portion 6. For the conveyance mechanism of a cut sheet, one using a roller and a guide is used, for example. In order to suppress the occurrence of double feed or the like of the recording media 13 to perform safe conveyance, a mechanism for blowing air from the side surface of the recording medium loaded on the tray to facilitate the conveyance of the recording medium 13 may be used. In order to protect the recording medium 13 from expanding and contracting due to changes in humidity, a temperature control mechanism may be used. As the shape of the recording medium 13, a cut sheet is used in this embodiment but a roll-shaped continuous sheet may be acceptable.

The image fixing portion 8 is disposed at the recording medium discharging side of the transfer portion 6 (right side of FIGURE). In the image fixing portion 8, two fixing rollers 35 and 36 are provided on the front and back surfaces of the recording medium 13. By pressurizing and heating the image transferred to be formed on the recording medium 13 by these fixing rollers 35 and 36, the fixability of the recorded image on the recording medium 13 can be increased. As the fixing rollers 35 and 36, a pair of rollers containing one pressurization roller and one heating roller is suitable.

EXAMPLES

Hereinafter, Examples and Comparative Examples of the invention are described below but the invention is not limited thereto. In the following description, "part" and "parts" are all based on mass.

Ink

As color materials, pigments shown in Table 1 were used. A color material 5 is an oxide body obtained by subjecting carbon black MCF88 to known oxidation reaction treatment using hypochlorous acid and is an anionic component.

TABLE 1

| Color material | Name |
|---|---|
| 1 | Carbon black: MCF 88 (manufactured by Mitsubishi Chemical Corporation) |
| 2 | Pigment Blue 15 (manufactured by Dainichiseika Color & Chemicals Mfg. Co., Ltd) |
| 3 | Pigment Red 7 (manufactured by Dainichiseika Color & Chemicals Mfg. Co., Ltd) |
| 4 | Pigment Yellow 74 (manufactured by Dainichiseika Color & Chemicals Mfg. Co., Ltd) |
| 5 | Oxide body of carbon black MCF88 (Acid value 0.75 mmol/g) |

As a water soluble resin (dispersant), a neutralization salt (Weight average molecular weight: 8,300, Acid value: 3.7 mmol/g, Anionic component) obtained by a potassium hydrate of a styrene-methacrylic acid-benzyl acrylate copolymer was used. The water soluble resin was obtained by polymerizing by the method described in Japanese Patent Laid-Open No. 2009-096175.

A batch type vertical sand mill (manufactured by IMEX) was filled with each color material and a dispersant, glass beads having a diameter of 1 mm were charged therein as a medium, water-cooling was performed, and dispersion treatment was performed for 3 hours. The dispersion liquid was placed on a centrifugal separator to remove coarse particles, thereby producing inks having color materials with a weight average particle diameter of 100 to 200 nm with the composition shown in Table 2.

TABLE 2

| | Colorant | | Dispersant | | | | | Total acid value <mmol/g> |
|---|---|---|---|---|---|---|---|---|
| | Type | Amount <part> | Type | Amount <part> | Solvent | Water | Surfactant | |
| Black ink 1 | 1 | 2 | 1 | 2 | Diethylene glycol 10 parts | 85 parts | AcetylenolE100 1 part | 3.7 |
| Cyan ink 1 | 2 | 2 | 1 | 2 | | | | 3.7 |
| Yellow ink 2 | 3 | 2 | 1 | 2 | | | | 3.7 |
| Magenta ink 3 | 4 | 2 | 1 | 2 | | | | 3.7 |
| Black ink 2 | 5 | 2 | — | — | | | | 0.75 |

Aggregation Liquid

As the polymer compound, the polymer compounds shown in Table 3 were prepared. Polymer compounds 1 to 6 are polymer compounds having a polysaccharide structure having an amino group. The comparative polymer compounds 1 and 2 are not the polymer compounds. The weight average molecular weight and the amine value are published values of manufacturers.

TABLE 3

| | Compound name | Weight average molecular weight | Amine value <mmol/g> |
|---|---|---|---|
| Polymer compound 1 | Hydroxyethyl cellulose hydroxypropyl trimethylammonium chloride ether (Cellulose derivative having an amino group) Trade name: POIZ C-150L, manufactured by Kao Corporation, Solid content 100% by mass | 4,400,000 | 0.7-1.1 |
| Polymer compound 2 | Hydroxyethyl cellulose hydroxypropyl trimethylammonium chloride ether (Cellulose derivative having an amino group) Trade name: POIZ C-60H, manufactured by Kao Corporation, Solid content 100% by mass | 2,000,000 | 1.1-1.9 |
| Polymer compound 3 | Guar hydroxypropyl trimonium chloride (Guar gum derivative having an amino group) Trade name: Jaguar C13S, manufactured by Rhodia Novecare, Solid content 100% by mass | 7,300,000 | 1.0 |
| Polymer compound 4 | Chitosan Trade name: HFP chitosan, manufactured by Jakwang, Solid content 100% by mass | 200,000-1,000,000 | 5.2 |
| Polymer compound 5 | Hydroxyethyl cellulose hydroxypropyl trimethylammonium chloride ether (Cellulose derivative having an amino group) Trade name: LEOGARD MLP, manufactured by Lion Corporation, Solid content 100% by mass | 2,000,000 | 0.4 |
| Polymer compound 6 | Hydroxyethyl cellulose dimethyldiallylammonium chloride (Cellulose derivative having an amino group) Trade name: Cellcoat L-200, manufactured by Nippon NSC Ltd., Solid content 100% by mass | 30,000 | 1.4 |
| Comparative polymer compound 1 | Dicyandiamide·diethylene triamine polycondensate Trade name: Unisense KHP10P, manufactured by Senka, Solid content 100% by mass | — | 23.8 |
| Comparative polymer compound 2 | Hydroxyethyl cellulose Manufactured by Polyscieneces, Solid content 100% by mass | 1,000,000 | 0.0 |

Using the polymer compounds mentioned above, the aggregation liquids shown in Table 4 were produced. The pKa of glutaric acid in Table 4 is 4.1.

TABLE 4

| | Polymer compound | | Aggregation agent | | Organic solvent | | Surfactant | | Water |
|---|---|---|---|---|---|---|---|---|---|
| | Type | Amount <part> | Type | Amount <part> | Type | Amount <part> | Type | Amount <part> | <part> |
| Aggregation liquid 1 | Polymer compound 1 | 1 | Calcium nitrate | 35 | 1,5-pentanediol | 9 | Acetylenol E100 | 1 | 54 |
| Aggregation liquid 2 | Polymer compound 2 | 1 | Calcium nitrate | 35 | 1,5-pentanediol | 9 | Acetylenol E100 | 1 | 54 |
| Aggregation liquid 3 | Polymer compound 3 | 1 | Calcium nitrate | 35 | 1,5-pentanediol | 9 | Acetylenol E100 | 1 | 54 |
| Aggregation liquid 4 | Polymer compound 4 | 5 | Calcium nitrate | 35 | 1,5-pentanediol | 9 | Acetylenol E100 | 1 | 50 |
| Aggregation liquid 5 | Polymer compound 5 | 1 | Calcium nitrate | 35 | 1,5-pentanediol | 9 | Acetylenol E100 | 1 | 54 |
| Aggregation liquid 6 | Polymer compound 6 | 1 | Calcium nitrate | 35 | 1,5-pentanediol | 9 | Acetylenol E100 | 1 | 54 |
| Aggregation liquid 7 | Polymer compound 1 | 1 | Glutaric acid | 35 | 1,5-pentanediol | 9 | Acetylenol E100 | 1 | 54 |
| Comparative aggregation liquid 1 | Comparative polymer compound 1 | 5 | Calcium nitrate | 35 | 1,5-pentanediol | 9 | Acetylenol E100 | 1 | 50 |
| Comparative aggregation liquid 2 | Comparative polymer compound 2 | 1 | Calcium nitrate | 35 | 1,5-pentanediol | 9 | Acetylenol E100 | 1 | 54 |

TABLE 4-continued

| | Polymer compound | | Aggregation agent | | Organic solvent | | Surfactant | | Water |
|---|---|---|---|---|---|---|---|---|---|
| | Type | Amount <part> | Type | Amount <part> | Type | Amount <part> | Type | Amount <part> | <part> |
| Comparative aggregation liquid 3 | Polymer compound 1 | 1 | — | — | 1,5-pentanediol | 9 | Acetylenol E100 | 1 | 89 |
| Comparative aggregation liquid 4 | Comparative polymer compound 1 | 5 | — | — | 1,5-pentanediol | 9 | Acetylenol E100 | 1 | 85 |
| Comparative aggregation liquid 5 | — | — | Calcium nitrate | 35 | 1,5-pentanediol | 9 | Acetylenol E100 | 1 | 55 |

Recording Method

Printed substances on which the final image was formed were obtained using the above-described inks and aggregation liquids by the following transfer type inkjet recording method.

(A) Aggregation Liquid Supply Process

A material was prepared in which the surface of a 0.5 mm thick PET (polyethylene terephthalate) film was coated with a silicone rubber (Trade name; High Precision Ultrathin SR Sheet, manufactured by Tigers Polymer Corporation) with a thickness of 0.2 mm. The material was subjected to surface hydrophilization using a parallel flat plate type atmospheric pressure plasma treatment device (APT-203, manufactured by Sekisui Chemical) to form the intermediate transfer member to be used in this Example. The aggregation liquid was given to the intermediate transfer member in a liquid state using a roll coater with a coating amount of 2.0 g/m².

(B) Intermediate Image Formation Process

The ink was given to the image formation surface of the intermediate transfer member to which the aggregation liquid was given by an inkjet device (Nozzle arrangement density 1200 dpi, Ejection amount 4 pl) to thereby form an intermediate image.

(C) Transfer Process

The intermediate image on the intermediate transfer member was dried. After drying, a recording medium (printing sheet, Basis weight; 127.9 g/m², Trade name; O.K. prince Joshitsu E F, manufactured by Oji Paper) was pressure-bonded to the image formation surface of the intermediate image with a pressurization roller to transfer the intermediate image to the recording medium.

(D) Fixing process

The recording medium to which the intermediate image was transferred was heated with 110° C. hot wind for 10 minutes to fix the image. Thus, a recording medium on which the final image was formed was obtained.

The ink and the aggregation liquid used in each Example are shown in Table 5.

TABLE 5

| | Ink | Aggregation liquid |
|---|---|---|
| Example 1 | Black ink 1 | Aggregation liquid 1 |
| Example 2 | Black ink 1 | Aggregation liquid 2 |
| Example 3 | Black ink 1 | Aggregation liquid 3 |
| Example 4 | Black ink 1 | Aggregation liquid 4 |
| Example 5 | Black ink 1 | Aggregation liquid 5 |
| Example 6 | Black ink 1 | Aggregation liquid 6 |
| Example 7 | Black ink 1 | Aggregation liquid 7 |
| Example 8 | Black ink 2 | Aggregation liquid 1 |
| Comparative Example 1 | Black ink 1 | Comparative aggregation liquid 1 |
| Comparative Example 2 | Black ink 1 | Comparative aggregation liquid 2 |
| Comparative Example 3 | Black ink 1 | Comparative aggregation liquid 3 |
| Comparative Example 4 | Black ink 1 | Comparative aggregation liquid 4 |
| Comparative Example 5 | Black ink 1 | Comparative aggregation liquid 5 |
| Comparative Example 6 | Black ink 2 | Comparative aggregation liquid 1 |

Evaluation

In the intermediate image formation process in the above-described recording method, 2 cm×2 cm intermediate images were formed on the intermediate transfer member with a recording density of 10% Duty, 100% Duty, and 350% Duty. The transfer properties to the recording medium, Wet scratch resistances, and bleeding of the obtained intermediate images were evaluated based on the following criteria.

Transfer Properties

The intermediate transfer bodies after the transfer process were observed under an optical microscope to evaluate an ink remaining area ratio of each intermediate image based on the following criteria. The remaining area ratio was calculated by subjecting the image data obtained by the optical microscope to image processing. The case where all the inks transfer to the recording medium and the intermediate image does not remain refers to a state where the remaining area ratio is 0%.

A: The ink remaining area ratio on the intermediate transfer member is 0% or more and lower than 5%.
B: The ink remaining area ratio on the intermediate transfer member is 5% or more and lower than 10%.
C: The ink remaining area ratio on the intermediate transfer member is 10% or more and lower than 20%.
D: The ink remaining area ratio on the intermediate transfer member is 20% or more and lower than 30%.
E: The ink remaining area ratio on the intermediate transfer member is 30% or more.

Wet Scratch Resistances

The final images (2 cm×2 cm) obtained by transferring the 2 cm×2 cm intermediate images to the recording medium were evaluated for the Wet scratch resistances. First, the O.D. (Optical density) of the formed final image was measured. Next, 0.2 ml of water droplets was added dropwise onto the final images, and the final images were allowed to stand for 1 minute. Thereafter, scratch wiping (Wet scratch) was performed with a cleaning paper, and the O.D. of the center of the portion where the water droplets were added dropwise was measured. From these measurement results, the O.D. maintaining ratio was evaluated based on the following criteria. "O.D. maintaining ratio=100×(O.D. after Wet scratch)/(O.D. before Wet scratch)" was established. The "O.D." was measured using a spectrophotometer (Trade name; Spectrolino manufactured by Gretag Macbeth AG).

A: The O.D. maintaining ratio is 99% or more.
B: The O.D. maintaining ratio is 95% or more and lower than 99%.
C: The O.D. maintaining ratio is 90% or more and lower than 95%.
D: The O.D. maintaining ratio is 80% or more and lower than 90%.
E: The O.D. maintaining ratio is 60% or more and lower than 80%.

Bleeding

The aggregation liquid was given to the entire surface of the intermediate transfer member by the above-described recording method, and thereafter a square 2 cm on a side (100% Duty) was formed with the black ink. Immediately after the formation thereof, squares 2 cm on a side (100% Duty) were formed with the cyan ink 1, the yellow ink 1, and the magenta ink 1 in such a manner as to be adjacent to the three sides of the square formed with the black ink. Similarly as above, patterns were also formed in which four squares with 10% Duty and four squares with 350% Duty were formed. Next, the boundary portion of the intermediate images on the intermediate transfer member was observed under an optical microscope. The boundary portions refer to the boundary portion of the square formed with the black ink and the square formed with the cyan ink 1, the boundary portion of the square formed with the black ink and the square formed with the yellow ink 1, and the boundary portion of the square formed with the black ink and the square formed with the magenta ink 1. Then, among the bleeding occurring in each boundary portion, the portion where the bleeding level was the highest was calculated by image processing for the area ratio of the bleeding portion relative to the area of one square, and evaluated based on the following criteria.

A: The bleeding area ratio is lower than 0.1%.
B: The bleeding area ratio is 0.1% or more and lower than 1.0%.
C: The bleeding area ratio is 1.0% or more and lower than 10.0%.
D: The bleeding area ratio is 10.0% or more.

The above evaluation results are shown in Table 6.

TABLE 6

| | Transfer properties | | | Wet scratch resistances | | | Bleeding | | |
|---|---|---|---|---|---|---|---|---|---|
| | Printing Duty <%> | | | | | | | | |
| | 10 | 100 | 350 | 10 | 100 | 350 | 10 | 100 | 350 |
| Example 1 | A | A | A | A | A | A | A | A | A |
| Example 2 | A | A | A | A | A | A | A | A | A |
| Example 3 | A | A | A | A | A | A | A | A | A |
| Example 4 | A | A | A | A | A | A | A | A | A |
| Example 5 | A | A | B | A | A | B | A | A | B |
| Example 6 | A | A | B | A | A | B | A | A | B |
| Example 7 | A | A | A | A | A | A | A | A | A |
| Example 8 | A | A | B | B | B | B | A | A | A |
| Comparative Example 1 | B | B | C | C | C | D | A | A | B |
| Comparative Example 2 | B | C | C | D | E | E | A | A | B |
| Comparative Example 3 | B | C | C | C | C | D | C | C | D |
| Comparative Example 4 | B | C | D | C | D | D | C | D | D |
| Comparative Example 5 | C | D | E | E | E | E | A | A | B |
| Comparative Example 6 | C | D | E | D | D | E | A | A | B |

The transfer type inkjet recording methods of the invention of Examples 1 to 8 are excellent in all of the transfer properties, Wet scratch resistances, and bleeding.

In contrast, the transfer type inkjet recording methods of Comparative Examples 1, 2, 4, and 6 in which the polymer compound in the aggregation liquid was not the polymer compound according to aspects of the invention were not excellent particularly in the transfer properties and Wet scratch resistances. The transfer type inkjet recording method of Comparative Example 3 in which the aggregation liquid does not contain an aggregation agent was not excellent in the transfer properties, Wet scratch resistances, and bleeding. In Comparative Example 5 in which the aggregation liquid does not contain the polymer compound was not excellent in the transfer properties and Wet scratch resistances.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-270784 filed Dec. 3, 2010, which is hereby incorporated by reference herein in its entirety.

What is claimed is:

1. A transfer type inkjet recording method, comprising:
an aggregation liquid applying step for applying an aggregation liquid containing an aggregation agent to an image formation surface of an intermediate transfer member;
an intermediate image formation step for forming an intermediate image by applying by an inkjet recording method an ink containing an anionic component which aggregates by reacting with the aggregation agent to the image formation surface of the intermediate transfer member to which the aggregation liquid has been applied; and
a transfer process for transferring the intermediate image from the image formation surface having the intermediate image formed thereon to a recording medium by pressing the recording medium to the image formation surface,
wherein the aggregation liquid further contains a polymer compound having a polysaccharide structure having an amino group, and
wherein the weight average molecular weight of the polymer compound is 30,000 or more and 10,000,000 or less.

2. The transfer type inkjet recording method according to claim 1, wherein the amine value of the polymer compound is 0.3 mmol/g or more and 14.0 mmol/g or less.

3. The transfer type inkjet recording method according to claim 1, wherein the ink contains a pigment and an anionic dispersant as the anionic component.

4. The transfer type inkjet recording method according to claim 1, wherein the aggregation agent contains a metal salt or an acidic compound.

5. The transfer type inkjet recording method according to claim 3, wherein the aggregation agent is an acidic compound.

6. The transfer type inkjet recording method according to claim 1, wherein the weight average molecular weight of the polymer compound is 200,000 or more and 8,000,000 or less.

7. The transfer type inkjet recording method according to claim 2, wherein the amine value of the polymer compound is 0.5 mmol/g or more and 8.0 mmol/g or less.

8. The transfer type inkjet recording method according to claim 1, wherein the polymer compound having a polysaccharide structure having an amino group is the polymer compound having at least one selected from starch derivatives having an amino group, cellulose derivatives having an amino group, guar gum derivatives having an amino group, locust bean gum derivatives having an amino group, fenugreek gum derivatives having an amino group, tara gum derivatives having an amino group, curdlan derivatives having an amino group, carrageenan derivatives having an amino group and chitosan derivatives.

\* \* \* \* \*